United States Patent
Lorenz

(10) Patent No.: US 10,876,597 B2
(45) Date of Patent: Dec. 29, 2020

(54) TRANSMISSION FOR TOWED AGRICULTURAL EQUIPMENT

(71) Applicant: Seppi M. spa, Caldaro (IT)

(72) Inventor: Seppi Lorenz, Caldaro (IT)

(73) Assignee: SEPPI M. SPA, Caldaro (IT)

( * ) Notice: Subject to any disclaimer, the term of this patent is extended or adjusted under 35 U.S.C. 154(b) by 238 days.

(21) Appl. No.: 16/202,404

(22) Filed: Nov. 28, 2018

(65) Prior Publication Data
US 2019/0162273 A1 May 30, 2019

(30) Foreign Application Priority Data

Nov. 28, 2017 (IT) .................. 102017000136398

(51) Int. Cl.
| | |
|---|---|
| *F16H 3/091* | (2006.01) |
| *F16H 3/10* | (2006.01) |
| *A01B 71/06* | (2006.01) |
| *A01D 69/00* | (2006.01) |
| *A01D 69/06* | (2006.01) |

(Continued)

(52) U.S. Cl.
CPC ........... *F16H 3/091* (2013.01); *A01B 33/082* (2013.01); *A01B 71/06* (2013.01); *A01D 69/002* (2013.01); *A01D 69/06* (2013.01); *F16H 3/10* (2013.01); *F16H 57/021* (2013.01); *F16H 2200/0034* (2013.01)

(58) Field of Classification Search
CPC ........ A01D 69/08; A01D 69/06; F16H 3/091; F16H 3/10; A01B 33/082
See application file for complete search history.

(56) References Cited

U.S. PATENT DOCUMENTS

| | | | | |
|---|---|---|---|---|
| 3,457,798 A | * | 7/1969 | Musgrave | .............. A01D 69/06 74/473.1 |
| 3,461,656 A | * | 8/1969 | Van Ausdall | .......... A01D 69/06 56/249 |

(Continued)

FOREIGN PATENT DOCUMENTS

| | | |
|---|---|---|
| CN | 106612641 A | 5/2017 |
| DE | 20 2007 015 176 U1 | 4/2009 |

(Continued)

OTHER PUBLICATIONS

International Search Report and Written Opinion, dated Jul. 30, 2018.

*Primary Examiner* — Terence Boes
(74) *Attorney, Agent, or Firm* — Jacobson Holman PLLC

(57) ABSTRACT

A two-speed transmission for towed agricultural equipment activated through power take-off of a towing machine comprising an input shaft.
A pinion arranged on the input shaft entering into a transmission box activated by the input shaft through a hypoid tooth and/or conical coupling; a crown gear fixed onto an intermediate shaft arranged orthogonal to the input shaft having two different dimension gears. One of the two gears with a clutch is connected to the intermediate shaft, the gears of which being coupled with a gear on an output shaft. The connection of the intermediate shaft/gear of the output shaft without clutch one of the gears has a free wheel connection with the respective shaft. The output shaft is arranged in the same plane as the input shaft and the output shaft is connected at its two ends outside the transmission box with a shredding head.

7 Claims, 1 Drawing Sheet

(51) Int. Cl.
*F16H 57/021* (2012.01)
*A01B 33/08* (2006.01)

(56) References Cited

U.S. PATENT DOCUMENTS

| | | | | |
|---|---|---|---|---|
| 3,557,879 A | * | 1/1971 | Van Der Lely | A01B 33/082 172/32 |
| 4,805,704 A | * | 2/1989 | Kobashi | A01B 33/144 172/91 |
| 2004/0256120 A1 | * | 12/2004 | Oota | A01B 33/082 172/42 |
| 2007/0193408 A1 | * | 8/2007 | Martinez | F16H 57/029 74/609 |
| 2016/0183467 A1 | * | 6/2016 | Goering | B60K 17/28 477/6 |

FOREIGN PATENT DOCUMENTS

| | | | | |
|---|---|---|---|---|
| EP | 2 923 541 A1 | | 3/2015 | |
| EP | 3488676 A1 | * | 5/2019 | ........... A01B 33/082 |
| FR | 1 137 291 A | | 9/1963 | |

\* cited by examiner

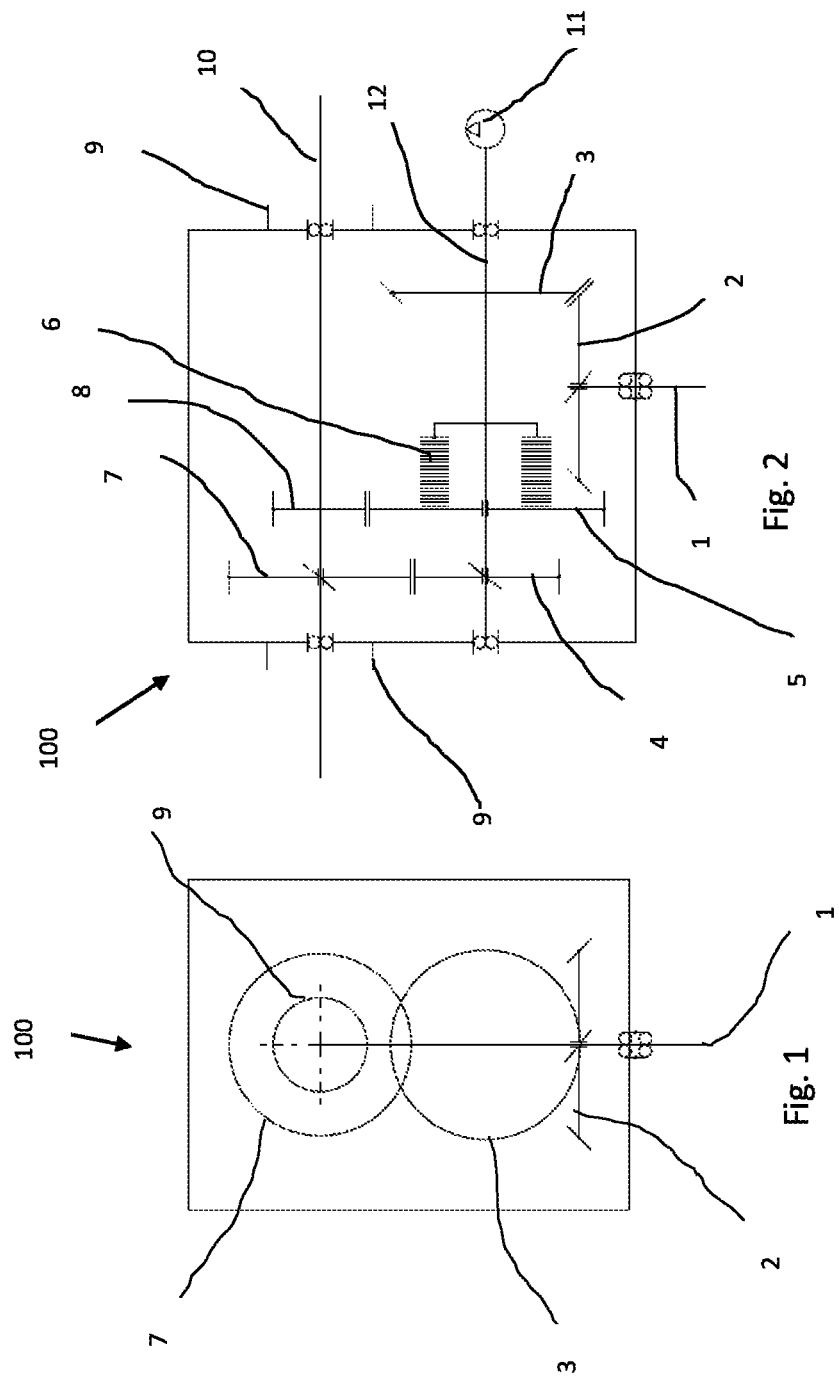

TRANSMISSION FOR TOWED AGRICULTURAL EQUIPMENT

BACKGROUND OF THE INVENTION

The present invention relates to a transmission for towed agricultural equipment to be connected to a towing machine or the like and activated through the towing machine.

From EP 2 923 541 a towed agricultural equipment is known to be connected to a towing machine, with working means that can be activated by means of mechanical units that can be activated by a shaft; said mechanical unit comprises a mechanical transmission with at least two shafts exiting from two different sides, to the articulated shaft to activate at least two connectable mechanical aggregates. Such towed equipment in particular can be a mower or a machine for haymaking in the form of windrows or a hay tedder. The output shafts of the drive transmission are in a non-aligned arrangement with each other and the articulated shafts are crossed with each other and connectable to the output shaft.

SUMMARY OF THE INVENTION

The present invention aims to offer a two-speed transmission for a connectable machine, that is more compact, simple and stable and furthermore allows the input shaft and the output shaft to be on the same plane.

According to the invention said aim is achieved by a transmission for towed agricultural equipment.

The connectable transmission for agricultural equipment, in particular a crusher or rotating tiller comprises an input shaft, which can be activated thorough agricultural equipment such as for example a tractor. This input shaft activates a pinion which activates through a hypoid tooth and/or conical coupling a crown gear. This crown gear is fixed to an intermediate shaft. On this intermediate shaft two gears with different dimensions are arranged. By means of a clutch or joint the gear with the larger dimensions of the two gears can be connected to the intermediate shaft, while the other gear is connected to the intermediate shaft. The two gears are always respectively coupled to a gear on the output shaft, since in the gear/gear without clutch or joint coupling at least one of the gears is connected to the respective shaft onto which it is fixed in a free wheel arrangement, the output shaft being arranged on the same plane as the input shaft. The output shaft can activate for example one or two shredding or cutting heads.

Advantageously, between the pinion connection of the input shaft and/or gear arranged on the output shaft coupled with the gear with clutch are connected by means of a free wheel connection to the respective shaft. In this way it is possible to avoid damage when turning the engine or the towing machine off.

Said transmission arrangement can be employed advantageously according to the invention in various connectable agricultural equipment, but it is particularly advantageous in connectable shredding or cutting equipment. Further details and characteristics of the invention will become apparent from the claims and the following description of a non limiting preferred embodiment, depicted in the attached drawings:

DESCRIPTION OF THE DRAWINGS

FIG. 1 is a vertical section of a transmission according to the invention, and

FIG. 2 is a horizontal section of a transmission according to the invention.

DESCRIPTION OF THE INVENTION

Number 1 in FIG. 1 indicates the input shaft of transmission 100 according to the invention. The input shaft 1 of the towed agricultural equipment is for example connected to the power take-off of a towing agricultural machine for example a tractor, which activates the input shaft 1. The activation means of input shaft 1 are not shown. The input shaft 1 is connected with a pinion 2. Advantageously the connection between input shaft 1 and pinion 2 has a free wheel to prevent any transmission of force while switching off the engine of the towing machine or the like due to inertia of certain mechanical members. The input shaft 1 activates the pinion 2 which is coupled by means of a conical and/or hypoid toothed connection to a crown gear 3.

The crown gear 3 is solidly arranged on an intermediate shaft 12. The intermediate shaft 12 is pivotally supported by a bearing. On the intermediate shaft 12 two gears 4 and 5 of different dimensions are arranged.

The gears 4 and 5 are respectively coupled with the respective gears 7 and 8.

Both the gear 7 and the gear 8 are arranged on an output shaft 10. The output shaft 10 is arranged in the same plane as the input shaft 1.

Through a clutch or joint 6 the gear 5, which is the wheel with larger dimensions than the gear 4, is coupled to the intermediate shaft 12. If the gear 5 is not coupled by means of a clutch or joint 6 this is free wheel. Through the coupling of the gear 5 with the intermediate shaft 12 this transmits the force by means of the gear 8 to the output shaft 10.

The gear 7 or the gear 4 are connected to the respective shaft by means of a free wheel connection, which means that as soon as the gear 5 is coupled by means of the clutch or joint 6 the output shaft 10 turns faster and one of the connections of the intermediate shaft 12 gear 5 or output shaft 10 gear 7 is the free wheel.

Through this system of free wheel clutch/joint gears and shafts two different speeds of the output shaft 10 are possible. The output shaft is pivotally supported by bearings on its sides. The output shaft 10 is preferably connected at its ends respectively with a shredding or cutting head.

The entire transmission box 101 is pivotally supported on a frame (not shown) by means of bearings 9.

This arrangement of the transmission allows the power take-off to be rotated with respect to the output shaft 10 and vice versa. This is particularly advantageous for working on a non flat terrain.

A hydraulic pump 11 to control the clutch or joint 6 can be provided.

The preferred embodiment is an arrangement wherein the crown gear 3 is arranged on a side of the axis of rotation of the pinion 2 in the frame 101 of the transmission and the gears 4 and 5 and the clutch/joint 6 are arranged on the other side of the axis of rotation of the pinion 2; in this way the clutch/joint 6 can be arranged in a space formed between the crown gear 3 and the pinion in the transmission box 101 of the transmission 100. In this way the entire transmission 100 is more compact with consequent advantages.

Finally it is clear that additions, changes or variations to the transmission 100 described herein can be applied which are obvious to a person skilled in the art without departing from the scope of protection provided by the attached claims.

KEY OF REFERENCE NUMBERS

1 input shaft
2 pinion
3 crown gear
4, 5, 7, 8 gears
6 clutch/joint
9 bearing
10 output shaft
11 pump
12 intermediate shaft
100 transmission
101 transmission box

The invention claimed is:

1. A two-speed transmission for towed agricultural equipment to a towing machine that is activated through power take-off of the towing machine, comprising an input shaft that is activated by the towing machine, wherein a pinion is arranged on the input shaft entering into a transmission box, said pinion being activated by the input shaft and that by activating through a hypoid tooth or conical coupling a crown gear fixed onto an intermediate shaft, the intermediate shaft being arranged substantially orthogonal to the input shaft, on the intermediate shaft two gears are arranged with different dimensions, and wherein by means of a clutch or joint one of the two gears can be connected to the intermediate shaft, the gears of the intermediate shaft are respectively coupled with a gear arranged on an output shaft, and wherein in the connection of the gear of the intermediate shaft to the gear of the output shaft without a clutch at least one of the gears has a free wheel connection with its respective shaft onto which it is fixed, and the output shaft being arranged in the same plane as the input shaft and the output shaft can be connected at its two ends outside the transmission box with a shredding head or cutter.

2. The two-speed transmission for towed agricultural equipment according to claim 1, wherein the gear, which can be coupled with the intermediate shaft, is the gear with the larger dimensions of the two gears arranged on the intermediate shaft.

3. The two-speed transmission for towed agricultural equipment according to claim 1, wherein the gear with the smaller dimensions of the two gears arranged on the intermediate shaft has a free wheel connection with the intermediate shaft.

4. The two-speed transmission for towed agricultural equipment according to claim 1, wherein the gear of the output shaft coupled with the gear of the intermediate shaft with the smaller dimensions of the two gears arranged on the intermediate shaft has a free wheel connection with the output shaft.

5. The two-speed transmission for towed agricultural equipment according to claim 1, wherein the connection between the pinion and the input shaft or the connection between the gear coupled with the gear with the larger dimensions of the two gears arranged on the intermediate shaft has a free wheel connection with the output shaft.

6. The two-speed transmission for towed agricultural equipment according to claim 1, wherein the transmission box is supported rotatably by two bearings.

7. The two-speed transmission for towed agricultural equipment according to claim 1, wherein the crown gear is arranged on one side of the axis of rotation of the pinion in a frame and the gears and the clutch are arranged on the other side of the axis of rotation of the pinion in the frame and the clutch is arranged in the space formed between the pinion and the crown gear.

* * * * *